(12) United States Patent
Liubakka (10) Patent No.: US 12,088,036 B2
(45) Date of Patent: Sep. 10, 2024

(54) WIRING APPARATUS AND SYSTEM

(71) Applicant: Glenn Liubakka, Andover, MN (US)

(72) Inventor: Glenn Liubakka, Andover, MN (US)

(73) Assignee: Glenn Liubakka, Andover, MN (US)

( * ) Notice: Subject to any disclaimer, the term of this patent is extended or adjusted under 35 U.S.C. 154(b) by 289 days.

(21) Appl. No.: 17/696,178

(22) Filed: Mar. 16, 2022

(65) Prior Publication Data

US 2022/0302627 A1    Sep. 22, 2022

Related U.S. Application Data

(60) Provisional application No. 63/162,259, filed on Mar. 17, 2021.

(51) Int. Cl.
| | | |
|---|---|---|
| H01R 13/46 | (2006.01) | |
| H01R 13/627 | (2006.01) | |
| H01R 13/74 | (2006.01) | |
| H01R 25/00 | (2006.01) | |
| H01R 31/06 | (2006.01) | |
| H02G 3/04 | (2006.01) | |
| H02G 3/06 | (2006.01) | |

(52) U.S. Cl.
CPC ......... *H01R 13/46* (2013.01); *H01R 13/6273* (2013.01); *H01R 13/743* (2013.01); *H01R 25/003* (2013.01); *H01R 31/06* (2013.01); *H02G 3/0616* (2013.01); *H02G 3/0462* (2013.01)

(58) Field of Classification Search
CPC .. H01R 13/46; H01R 13/6273; H01R 13/743; H01R 25/003; H01R 31/06; H02G 3/0616; H02G 3/0462; H02G 3/0481
See application file for complete search history.

(56) References Cited

U.S. PATENT DOCUMENTS 10,601,189 B1 *   3/2020   Smith ................. H01R 13/745

* cited by examiner

*Primary Examiner* — Briggitte R. Hammond
(74) *Attorney, Agent, or Firm* — Billion & Armitage (57) ABSTRACT

An electric metallic tube (EMT) conduit apparatus includes an electric metallic tube (EMT) conduit, a first insulated connector housing attached to a first end of the electric metallic tube (EMT) conduit and a second insulated connector housing attached to a first end of the electric metallic tube (EMT) conduit. The first insulated connector housing includes a plurality of electrically conductive male pins and the second insulated connector housing includes a plurality of electrically conductive female pins. A plurality of conductors within the electric metallic tube (EMT) conduit include a first end attached to one of the male pins of the first insulated connector housing, and a second end attached to one of the female pins of the second insulated connector housing.

17 Claims, 8 Drawing Sheets

WIRING APPARATUS AND SYSTEM

CROSS REFERENCE TO RELATED APPLICATIONS

This application claims benefit of U.S. Provisional Application No. 63/162,259, filed on Mar. 17, 2021, which is incorporated by reference in its entirety.

BACKGROUND OF THE INVENTION

Current Standard industry practice for wiring in an industrial or commercial building includes the following steps. As an overview, conduit is placed throughout a space. The conduit is placed where the wire is run. Conduit can be metal, known as EMT (electrical metal tubing), or can be PVC. Conduit is run throughout the space. The conduit usually comes in 10 foot or 20 foot lengths. The conduit is bent to go around obstacles or corners. The conduit is also bent to reach metal electrical boxes containing outlets or switches. The bends may be required by code. An electrical run in a building is generally not in exact 10 to 20 foot lengths so many times the conduit has to be cut. Individual pieces of conduit also have to be joined. Each individual piece of conduit is either connected to another section of conduit using a coupling or connected to an electrical box with an adaptor fitting.

The adaptor fitting joins an end of conduit to a junction box. The connectors and adaptor fittings provide a less abrasive surface so that insulation on a wire will not be cut through or otherwise damaged. Such damage would cause problems as the circuit may be grounded to the conduit rather than flowing to and through various electrical switches and outlets and plug ins. Many of the adaptor fittings hold incoming conduit with set screws that need to be tightened to affix a free end of conduit to the adaptor fitting.

After the conduit is initially placed in a building, the conduit is empty and devoid of wires. An electrician then pulls wires through the conduit to the various boxes, and the various connections and adapters to complete electrical circuits. The circuit requirements determine many aspects of the wiring task, including the following: the size of conduit required; the amount of wires that are pulled through the conduit at various locations; the size of wires that are pulled; and the type of wire that is pulled.

The current standard industry practice is time consuming. First the conduit for all the circuits in a building has to be put in place and then the wire has to be pulled through the various lengths of conduit. Some runs of conduit will carry more than two conductors so there is a chance for more mistakes as a circuit may be forgotten or skipped. If a circuit is missed it will be troublesome to add. Once the wires are pulled, the ends are cut off and lengths of wire are placed in junction boxes and the like. The current standard industry practice is not only time consuming but labor intensive. There is a need for a product that saves time and labor so that the cost of installing an electrical system is less. There is also a need for reliable system that will endure for a long time.

SUMMARY OF THE INVENTION

The inventions disclosed is an electric metallic tube (EMT) conduit apparatus that includes an electric metallic tube (EMT) conduit, a first insulated connector housing attached to a first end of the electric metallic tube (EMT) conduit and a second insulated connector housing attached to a first end of the electric metallic tube (EMT) conduit. The first insulated connector housing includes a plurality of electrically conductive male pins and the second insulated connector housing includes a plurality of electrically conductive female pins. A plurality of conductors within the electric metallic tube (EMT) conduit include a first end attached to one of the male pins of the first insulated connector housing, and a second end attached to one of the female pins of the second insulated connector housing. In some embodiments the electric metallic tube (EMT) conduit apparatus also includes a swivel joint that joins the first insulated connector housing to the first end of the electric metallic tube (EMT) conduit. In other embodiments, the electric metallic tube (EMT) conduit apparatus includes both a first swivel joint that joins the first insulated connector housing to the first end of the electric metallic tube (EMT) conduit, and a second swivel joint that joins the second insulated connector housing to the second end of the electric metallic tube (EMT) conduit. The plurality of conductors running the length of the electric metallic tube (EMT) conduit are insulated. The plurality of sets of wires include a neutral wire, a positive wire and a ground wire. In some embodiments, there are seven individual wires connecting the male pins of the first insulated connector housing to the female pins of the second insulated connector housing. In one embodiment, the electric metallic tube (EMT) conduit, the first insulated connector housing attached to a first end of the electric metallic tube, and the second insulated connector housing attached to a second end of the electric metallic tube substantially seal the plurality of conductors within the electric metallic tube (EMT) conduit.

The electric metallic tube (EMT) conduit is formed so that it can snap fit to other components to for an electrical system for a building. The electrical system for a building includes a plurality of electric metallic tube (EMT) conduit apparatus snap fit to one another to form a run of the plurality of electric metallic tube (EMT) conduit apparatus. Each electric metallic tube (EMT) conduit apparatus includes an electric metallic tube (EMT) conduit, a first insulated connector housing attached to a first end of the electric metallic tube (EMT) conduit and a second insulated connector housing attached to a first end of the electric metallic tube (EMT) conduit. The first insulated connector housing includes a plurality of electrically conductive male pins and the second insulated connector housing includes a plurality of electrically conductive female pins. A plurality of conductors within the electric metallic tube (EMT) conduit include a first end attached to one of the male pins of the first insulated connector housing, and a second end attached to one of the female pins of the second insulated connector housing. In some embodiments the electric metallic tube (EMT) conduit apparatus also includes a swivel joint that joins the first insulated connector housing to the first end of the electric metallic tube (EMT) conduit. In another embodiment of the electrical system for a building, the electric metallic tube (EMT) conduit apparatus includes both a first swivel joint that joins the first insulated connector housing to the first end of the electric metallic tube (EMT) conduit, and a second swivel joint that joins the second insulated connector housing to the second end of the electric metallic tube (EMT) conduit.

Further embodiments of the electrical system for a building, include a box fitting. The box fitting includes a third insulated connector housing with pins that match to at least one of the first insulated connector housing or the second insulated connector housing of the electric metallic tube (EMT) conduit apparatus. The third insulated connector attached to one end of the box fitting. The box fitting also includes a collet formed to snap fit to a knock-out opening of a steel box, The collet is attached to the other end of the box fitting.

Other embodiments of the box fitting includes a curved portion for providing an elevational transition between the electric metallic tube (EMT) conduit and the box fitting. In some embodiments, the curved portion has an angle of substantially 90-degrees, 45-degrees, or 30-degrees. In still further embodiments, the curved portion for providing an elevational transition between the electric metallic tube (EMT) conduit and the box fitting also a swivel portion which allows fine alignment.

Other fittings are also contemplated in further embodiments of the electrical system for a building. One fitting is a tee box adapter fitting that includes a first tee box insulated connector housing on one end of the tee box adapter, a second tee box insulated connector housing on one end of the tee box adapter, and a T-shaped conduit carrying a plurality of insulated conductors electrically connected to the first tee box insulated connector housing and the second tee box insulated connector housing.

Still further embodiments of the electrical system for a building include a four-way cross connector that includes a main body having at least three electrical connection points, a first four-way insulated connector housing attached to the main body, a second four-way insulated connector housing attached to the main body, a third four-way insulated connector housing attached to the main body and a fourth four-way insulated connector housing attached to the main body. The four-way cross connector also includes a plurality of connectors from the first four-way insulated connector housing, the second four-way insulated connector housing, the third four-way insulated connector housing, and the fourth four-way insulated connector housing that are electrically attached to the three electrical connection points in the main body.

DETAILED DESCRIPTION

All FIGs are illustrated for ease of explanation of the basic teachings of the present invention only. The extensions of the FIGs with respect to number, position, relationship and dimensions of the parts to form the preferred embodiment will be explained or will be within the ordinary skill of the art after the following description has been read and understood. Further, the exact dimensions and dimensional proportions to conform to specific force, weight, strength, and similar requirements for various applications will likewise be within the ordinary skill of the art after the following description has been read and understood.

Where used in various Figures of the drawings, the same numerals designate the same or similar parts. Furthermore, when the terms "upper," "lower," "right," "left," "forward," "rear," "first," "second," "inside," "outside," "front," "back," and similar terms are used, the terms should be understood to reference only the structure shown in the drawings and utilized only to facilitate describing the illustrated embodiments.

The Figures generally illustrate exemplary embodiments of the apparatus. The particularly illustrated embodiments of the apparatus have been chosen for ease of explanation and understanding. These illustrated embodiments are not meant to limit the scope of coverage but, instead, to assist in understanding the context of the language used in this specification and in the appended claims. Accordingly, the appended claims may encompass variations of the apparatus and methods that differ from the illustrated embodiments.

Figure 1:
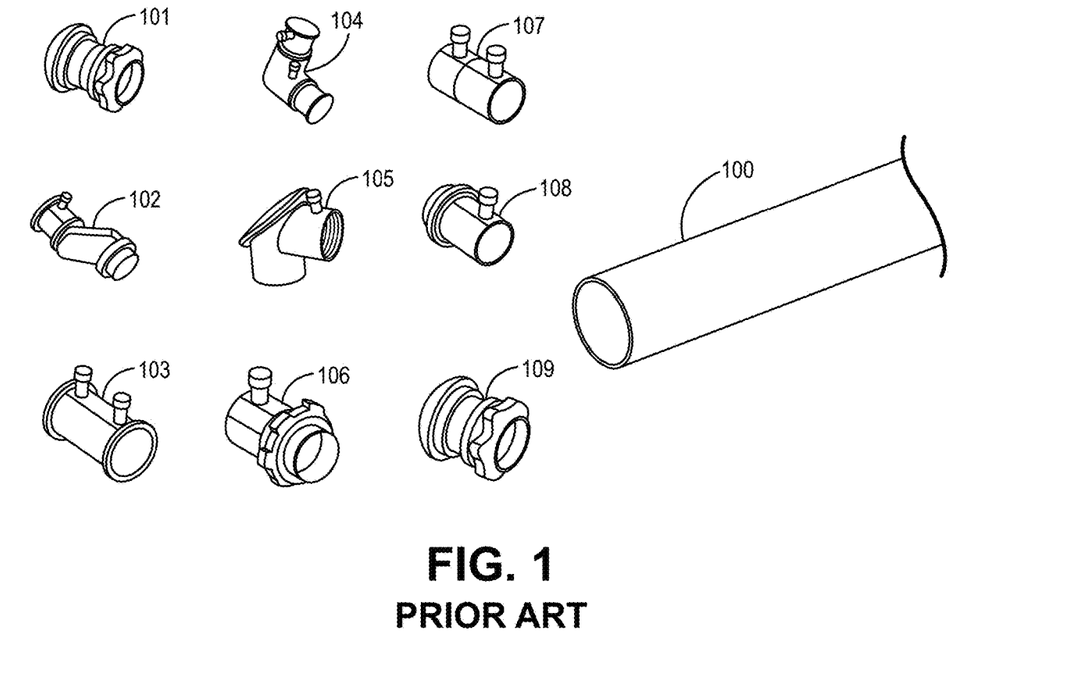
FIG. 1 is an isometric view of a conduit and a number of connecters and adapters that are used in current standard industry practice (prior art) for wiring in an industrial or commercial building.

FIG. 1 is an isometric view of an empty conduit 100 and a number of connecters and adapters 101, 102, 103, 104, 105, 106, 107, 108, 109 that are used in current standard industry practice (prior art) for wiring in an industrial or commercial building. An electrician forms all the electrical circuits in a building with multiple lengths of conduit 100, connected together with the various connecters. The conduit portion terminates near a junction box or switch box which has punch out openings at a slightly different distance from a wall or other planar surface than the path of the conduit. The conduit has to generally be bent to the appropriate elevation and the conduit is terminated and attached to the punch-out opening in the junction box or switch box. Once all the paths are formed, the electrician has to pull wire through the previously formed paths. Only then, can the electrician complete the wiring project. An electrical run in a building is generally not in exact 10 to 20 foot lengths so many times the conduit has to be cut. Individual pieces of conduit also have to be joined. Each individual piece of conduit is either connected to another section of conduit using a coupling or connected to an electrical box with an adaptor fitting before the wire can be pulled or routed through the electrical conduit. The conduit can be metal or plastic, such as pvc plastic.

Figure 2:
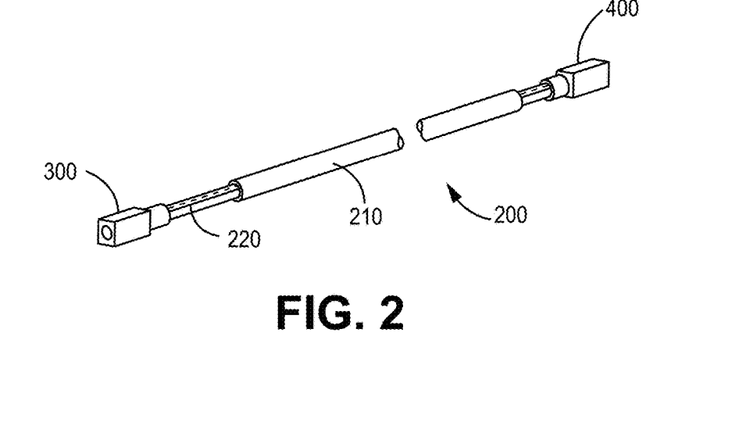
FIG. 2 is an exploded isometric view of a conduit having internal wires and a male pin insulated housing end and a female pin insulated housing end, according to an example embodiment.

FIG. 2 is an exploded isometric view of a conduit apparatus 200 having a conduit 210, internal wires 220 within the conduit 210, and having a male pin insulated housing end 300 and a female pin insulated housing end 400, according to an example embodiment. The male pin insulated housing end 300 of a first conduit apparatus 200 mateably engages the female pin insulated housing end 400 of second conduit apparatus (not shown). In other words, an electrician merely has to plug one conduit apparatus 200 to another conduit apparatus (not shown) to form a majority of the electrical circuits in a commercial building. When the male pin insulated housing end 300 of a first conduit apparatus 200 engages the female pin insulated housing end 400 of second conduit apparatus (not shown) a substantially sealed electrical conductor path is formed. Additionally, the conduit apparatus 200, when assembled is a substantially sealed unit. The plurality of wires is sealed within the conduit 210. The male pin insulated housing end 300 and the female pin insulated housing end 400 receive the ends of the plurality of wires and are also substantially sealed. The male pin insulated housing end 300 has a crimp end 310 that attaches to the conduit 210. The female pin insulated housing end 400 has a crimp end 410 that attaches to the conduit 210. The male pin insulated housing end 300 also has swivel joint 312 proximate the crimp end 310. Similarly, the female pin insulated housing end 400 has swivel joint 412 proximate the crimp end 410. The male pin insulated housing end 300 and, the female pin insulated housing end 400 will be further detailed in FIGS. 3A-3D, and FIGS. 4A-4D, respectively.

Figure 3A:
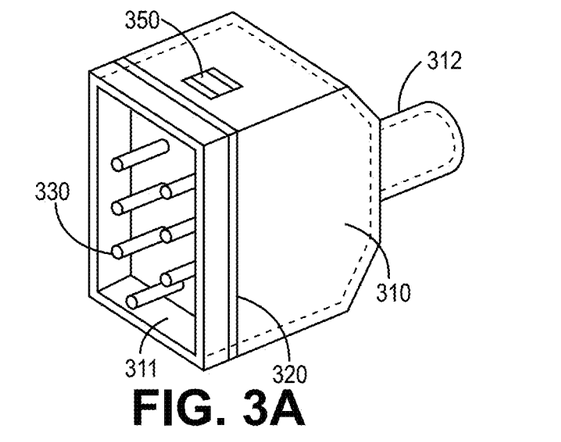
FIG. 3A is an isometric view of a male pin insulated housing end for a conduit, according to an example embodiment.
Figure 3B:
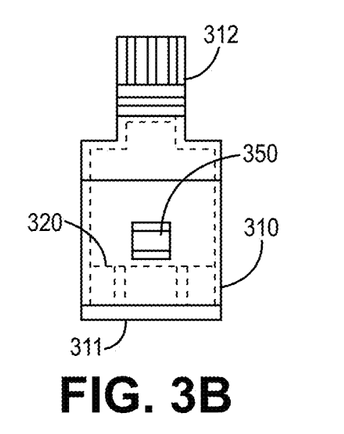
FIG. 3B is a top view of a male pin insulated housing end for a conduit, according to an example embodiment.
Figure 3C:
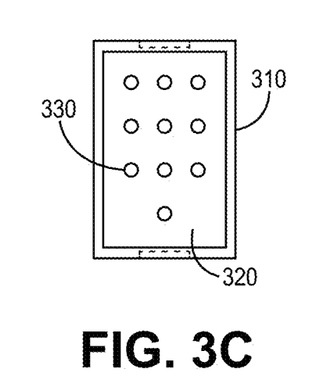
FIG. 3C is a front view of a male pin insulated housing end for a conduit, according to an example embodiment.
Figure 3D:
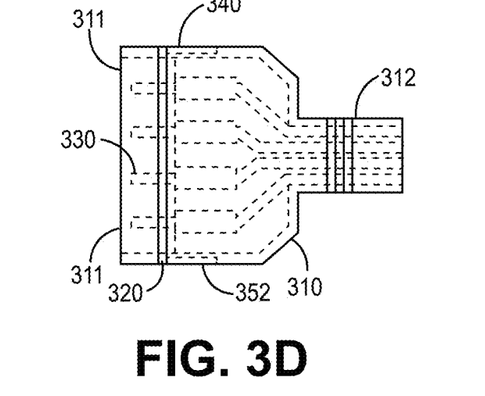
FIG. 3D is an side view of a male pin insulated housing end for a conduit, according to an example embodiment.

FIG. 3A is an isometric view of a male pin insulated housing end 300 for a conduit 210, according to an example embodiment. FIG. 3B is a top view of a male pin insulated housing end 300 for a conduit 210, according to an example embodiment. FIG. 3C is a front view of a male pin insulated housing end 300 for a conduit 210, according to an example embodiment. FIG. 3D is a side view of a male pin insulated housing end 300 for a conduit 310, according to an example embodiment. The male pin insulated housing end 300 will now be further detailed while referring to FIGS. 3A-3D. The male pin insulated housing end 300 includes an insulated housing 310 having a pin end 311 and a crimped end 312. The housing holds a plate 320 which engages the insulated housing 310. Attached to and located inside the periphery of the plate 320 are a plurality of male pins 330. The male pins face outwardly toward the pin end 311 of the insulated housing 310. The outer periphery of the insulated housing 310 and the plate 320 form a pocket for receiving a female end 400 of the conduit assembly 200. As shown in FIGS. 3A-3D, there are seven male pins 330 which correspond to six wires which carry power or signals and a ground pin. The male pins 330 include a portion that attaches to individual wires or conductors to the plurality of male pins 330. These could be pins, blades, or flats 340 to which individual conductors or wires 220 are connected. In this embodiment, there are seven individual wires or conductors within the conduit 210 and to which the male pins 330 are electrically coupled. The crimp end 312 is designed to fit over a conduit 210 (shown in FIG. 2) and be attached to the conduit 210 by crimping the crimp end 312. The housing 310 also includes at least two latch openings 350, 352.

Figure 4A:
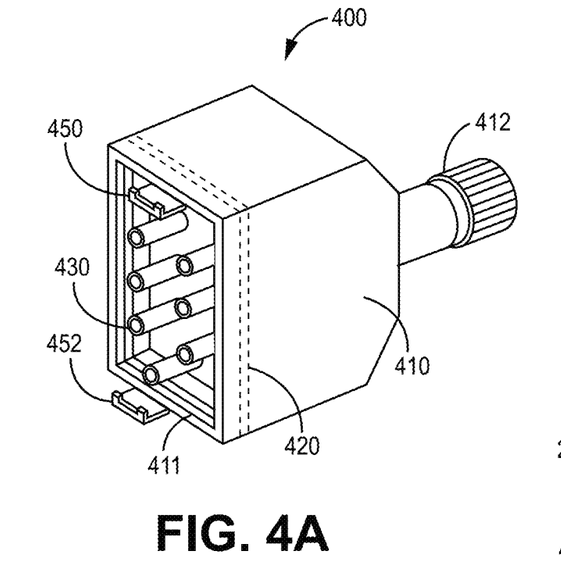
FIG. 4A is an isometric view of a female pin insulated housing end for a conduit, according to an example embodiment.
Figure 4B:
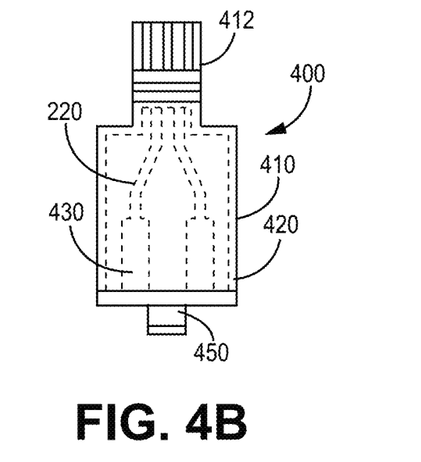
FIG. 4B is a top view of a female pin insulated housing end for a conduit, according to an example embodiment.
Figure 4C:
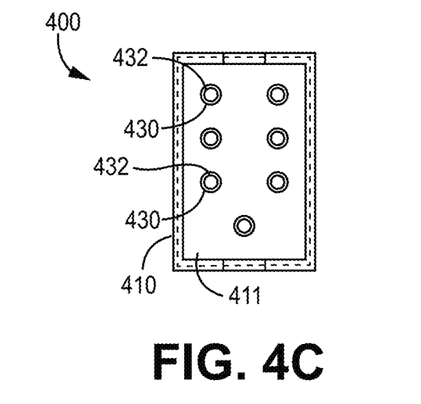
FIG. 4C is a front view of a female pin insulated housing end for a conduit, according to an example embodiment.
Figure 4D:
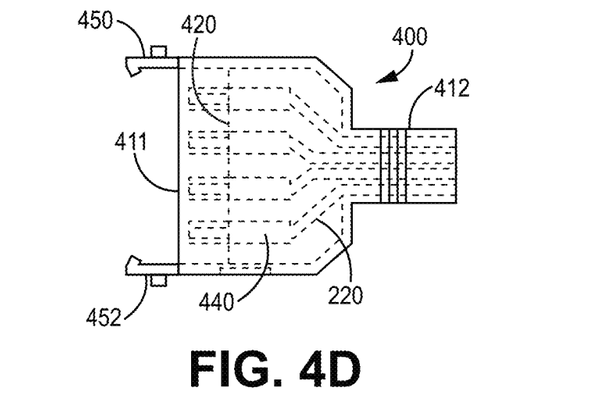
FIG. 4D is a side view of a female pin insulated housing end for a conduit, according to an example embodiment.

FIG. 4A is an isometric view of a female pin insulated housing end 400 for a conduit 210, according to an example embodiment. FIG. 4B is a top view of a female pin insulated housing end 400 for a conduit 210, according to an example embodiment. FIG. 4C is a front view of a female pin insulated housing end 400 for a conduit 210, according to an example embodiment. FIG. 4D is a side view of a female pin insulated housing end 400 for a conduit 210, according to an example embodiment. The female pin insulated housing end 400 will now be further detailed while referring to FIGS. 4A-4D. The female pin insulated housing end 400 includes an insulated housing 410 having a female pin end 411 and a crimp end 412. The housing holds a plate 420 which engages the insulated housing 410. Attached to and located inside the periphery of the plate 420 are a plurality of female pins 430. The female pins 430 face outwardly toward the female pin end 411 of the insulated housing 410. The outer periphery of the insulated housing 410 and the plate 420 fit within the pocket at the male end 300 of the conduit assembly 200. The female end 411 also includes a first latch 450 and a second latch 452 which are positioned to lock into the latch openings 350, 352, respectively, of the male end 300. As shown in FIGS. 4A-4D, there are seven female pins 430 which correspond to six wires which carry power or signals and a ground pin. The female pins 430 include a portion that attaches to individual wires or conductors 220 to the plurality of female pins 430. These could be pins, blades, or flats 440 to which individual conductors or wires 220 are connected. In this embodiment, there are seven individual wires or conductors within the conduit 210 and to which the female pins 430 are electrically coupled. The crimp end 412 is designed to fit over a conduit 210 (shown in FIG. 2) and be attached to the conduit 210 by crimping the crimp end 412. The housing 410 has an outer periphery sized to just fit within the inner periphery of the hosing 310. As best seen in FIG. 4C, the female pins 430 each have an opening 431 therein sized to receive and electrically connect the male pins 330 to the female pins 430. The male pins 330 fit within the female pins 430.

Figure 5A:
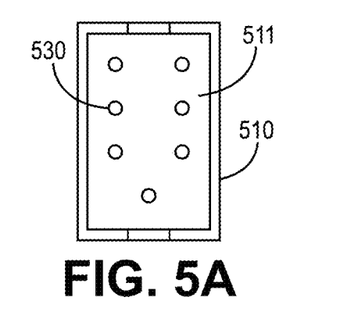
FIG. 5A is a front view of a box adapter fitting, according to an example embodiment.
Figure 5B:
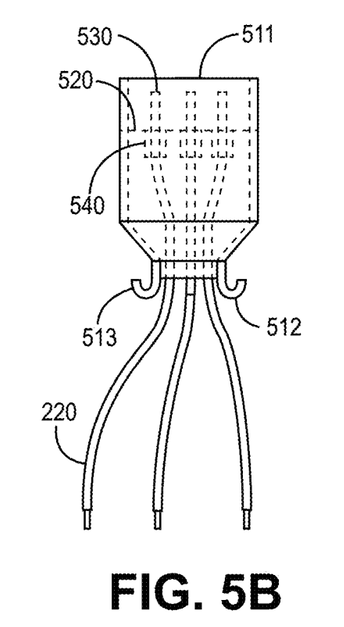
FIG. 5B is a top view of a box adapter fitting, according to an example embodiment.
Figure 5C:
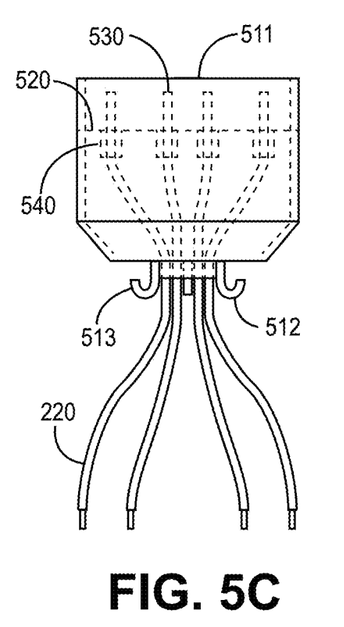
FIG. 5C is a side view of a box adapter fitting, according to an example embodiment.

FIG. 5A is a front view of a box adapter fitting 500, according to an example embodiment. FIG. 5B is a top view of a box adapter fitting 500, according to an example embodiment. FIG. 5C is a side view of a box adapter fitting 500, according to an example embodiment. Now referring to FIGS. 5A-5C, the box adapter fitting 500 will be discussed in more detail. The box adapter fitting 500 includes an insulated housing 510 which has a pin end 511 and a snap fit end 512. The housing holds a plate 520 which engages the insulated housing 510. Attached to and located inside the periphery of the plate 520 are a plurality of male pins 530. The male pins 530 face outwardly toward the pin end 511 of the insulated housing 510. The outer periphery of the insulated housing 510 and the plate 520 form a pocket for receiving a female end 400 of the conduit assembly 200. As shown in FIGS. 5A-35, there are seven male pins 530 which correspond to six wires which carry power or signals and a ground pin. The male pins 530 include a portion that attaches to individual wires or conductors to the plurality of male pins 530. These could be pins, blades, or flats 540 to which individual conductors or wires 220 are connected. In this embodiment, there are seven individual wires or conductors within the conduit 210 and to which the male pins 330 are electrically coupled. The snap fit end 512 includes a plurality of prongs 513 which are sized to engage a knock out opening of an electrical box. The electrical box can be for electrical switches. The electrical box can also be a junction box where a number of wires meet and are connected. Some junction boxes also receive wires or conductors 220 to which a light fixture, outlet or the like are attached thereto. The electrical box is typically manufactured with substantially circular openings that are covered with a substantially circular plate. The circular plate is attached by several small segments of metal so that the circular plate can be punched out and removed. In operation, the box adapter fitting 500 and specifically the pin end 511 is attached to another end of a conduit 210. In this particular example, the plurality of prongs 513 at the snap fit end 512 are forced into engagement with the knock out opening of an electrical box. The snap fit end 512 then fits to the electrical box. The conductors or wires 210 passing through the snap fit end are now in the box and a light fixture, switch, electrical outlet or the like can be electrically coupled to the wires 210 to form part of the desired circuit. In this particular embodiment, the box adapter fitting 500 has male pins 530. The box adapter fitting 500 could also be constructed with female pins so it could receive the male end 300 of the conduit apparatus 200.

Figure 6A:
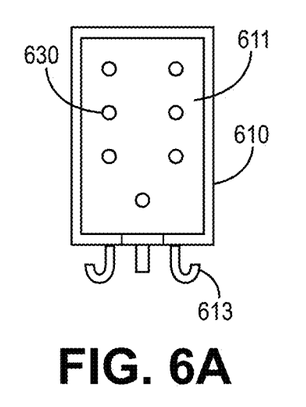
FIG. 6A is a front view of a box adapter fitting with a 90-degree bend, according to an example embodiment.
Figure 6B:
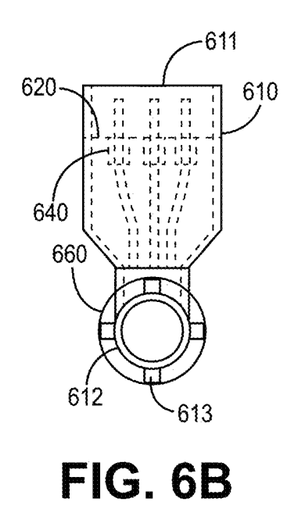
FIG. 6B is a top view of a box adapter fitting with a 90-degree bend, according to an example embodiment.
Figure 6C:
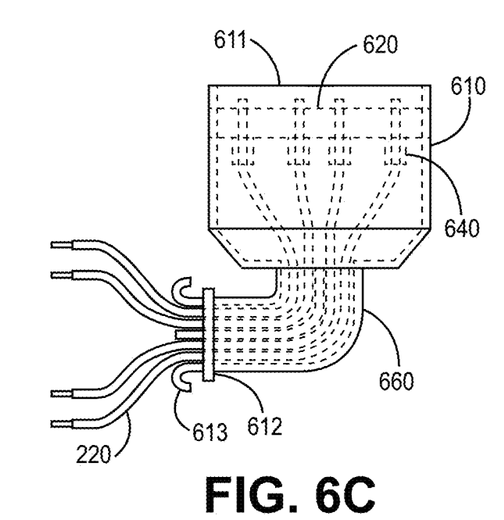
FIG. 6C is a side view of a box adapter fitting with a 90-degree bend, according to an example embodiment.

FIG. 6A is a front view of a box adapter fitting 600 with a 90-degree bend, according to an example embodiment. FIG. 6B is a top view of a box adapter fitting 500 with a 90-degree bend, according to an example embodiment. FIG. 6C is a side view of a box adapter fitting 600 with a 90-degree bend, according to an example embodiment. Now referring to FIGS. 6A-6C, the box adapter fitting 600 with the 90-degree bend will be discussed in more detail. The box adapter fitting 600 includes an insulated housing 610 which has a pin end 611 and a snap fit end 612. The housing holds a plate 620 which engages the insulated housing 610. Attached to and located inside the periphery of the plate 620 are a plurality of male pins 630. The male pins 630 face outwardly toward the pin end 611 of the insulated housing 610. The outer periphery of the insulated housing 610 and the plate 620 form a pocket for receiving a female end 400 of the conduit assembly 200. As shown in FIG. 6A, there are seven male pins 630 which correspond to six wires which carry power or signals and a ground pin. The male pins 630 include a portion that attaches to individual wires or conductors 220 to the plurality of male pins 630. These could be blades or flats 640 to which individual conductors or wires 220 are connected. In this embodiment, there are seven individual wires or conductors within the conduit 210 and to which the male pins 630 are electrically coupled. The snap fit end 612 includes a plurality of prongs 613 which are sized to engage the knock out opening of an electrical box. The snap fit end 612 also includes a 90-degree bend 660 In this particular example, the plurality of prongs 613 at the snap fit end 612 are forced into engagement with the knock out opening of an electrical box. The snap fit end 612 then fits to or engages the electrical box. The conductors or wires 210 passing through the snap fit end are now in the box and a light fixture, switch, electrical outlet or the like can be electrically coupled to the wires 210 to form part of the desired circuit. In this particular embodiment, the box adapter fitting 600 has male pins 630. The box adapter fitting 600 could also be constructed with female pins so it could receive the male end 300 of the conduit apparatus 200.

Figure 7A:
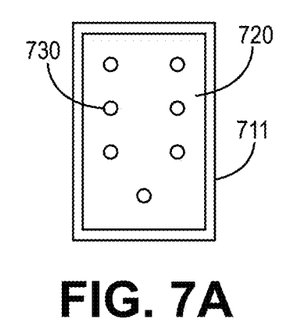
FIG. 7A is a front view of a box adapter fitting with a 45-degree bend, according to an example embodiment.
Figure 7B:
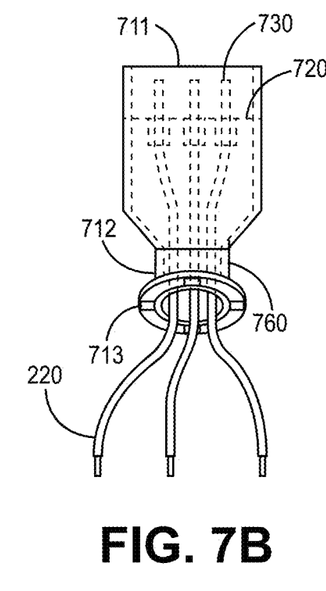
FIG. 7B is a top view of a box adapter fitting with a 45-degree bend, according to an example embodiment.
Figure 7C:
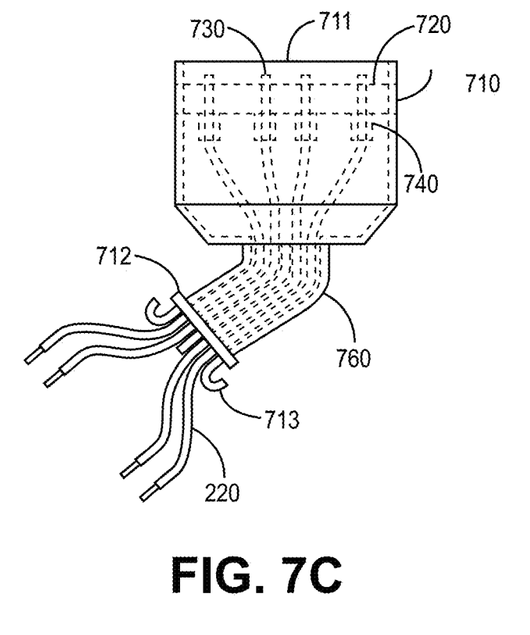
FIG. 7C is a side view of a box adapter fitting with a 45-degree bend, according to an example embodiment.

FIG. 7A is a front view of a box adapter fitting 700 with a 45-degree bend, according to an example embodiment. FIG. 7B is a top view of a box adapter fitting 500 with a 45-degree bend, according to an example embodiment. FIG. 7C is a side view of a box adapter fitting 700 with a 45-degree bend, according to an example embodiment. Now referring to FIGS. 7A-7C, the box adapter fitting 700 with the 45-degree bend will be discussed in more detail. The box adapter fitting 700 includes an insulated housing 710 which has a pin end 711 and a snap fit end 712. The housing holds a plate 720 which engages the insulated housing 710. Attached to and located inside the periphery of the plate 720 are a plurality of male pins 730. The male pins 730 face outwardly toward the pin end 711 of the insulated housing 710. The outer periphery of the insulated housing 710 and the plate 720 form a pocket for receiving a female end 400 of the conduit assembly 200. As shown in FIG. 7A, there are seven male pins 730 which correspond to six wires which carry power or signals and a ground pin. The male pins 730 include a portion that attaches to individual wires or conductors 220 to the plurality of male pins 730. These could be blades or flats 740 to which individual conductors or wires 220 are connected. In this embodiment, there are seven individual wires or conductors within the conduit 210 and to which the male pins 730 are electrically coupled. The snap fit end 712 includes a plurality of prongs 713 which are sized to engage the knockout opening of an electrical box. The snap fit end 712 also includes a 45-degree bend 760 In this particular example, the plurality of prongs 713 at the snap fit end 712 are forced into engagement with the knock out opening of an electrical box. The snap fit end 712 then fits to or engages the electrical box. The conductors or wires 210 passing through the snap fit end are now in the box and a light fixture, switch, electrical outlet or the like can be electrically coupled to the wires 210 to form part of the desired circuit. In this particular embodiment, the box adapter fitting 700 has male pins 730. The box adapter fitting 700 could also be constructed with female pins so it could receive the male end 300 of the conduit apparatus 200. It should be noted that the snap fit end 712 of the box adapter fitting 700 could be formed with most any angle and still be contemplated as within the scope of this invention. For example, a 30-degree bend could be employed. A 15-degree bend could also be employed. In fact, a bend of most any angle could be used or needed in various circumstances. All are contemplated as being within the scope of the present invention.

Figure 8A:
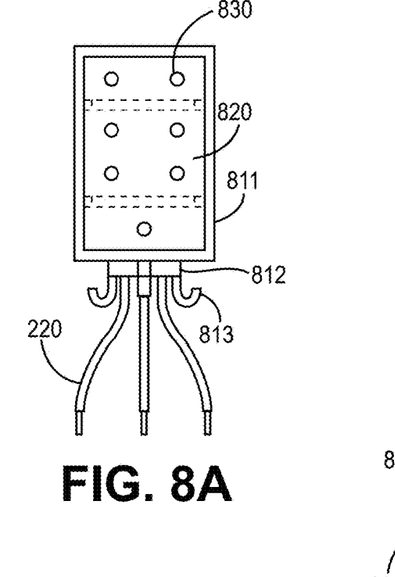
FIG. 8A is a front view of a male tee box adapter fitting with a 45-degree bend, according to an example embodiment.
Figure 8B:
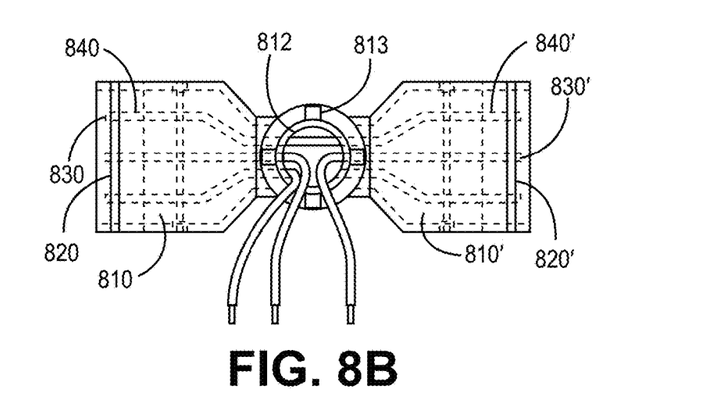
FIG. 8B is a top view of a male tee box adapter fitting with a 45-degree bend, according to an example embodiment.
Figure 8C:
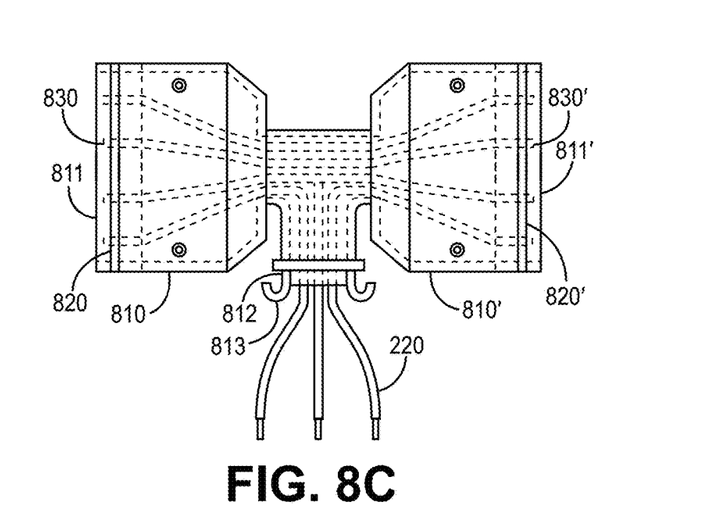
FIG. 8C is a side view of a male tee box adapter fitting with a 45-degree bend, according to an example embodiment.

FIG. 8A is a front view of a male tee box adapter fitting 800, according to an example embodiment. FIG. 8B is a top view of a male tee box adapter fitting 800, according to an example embodiment. FIG. 8C is a side view of a male tee box adapter fitting 800, according to an example embodiment. Now referring to FIGS. 8A-8C, the tee box adapter fitting 800 will be discussed in more detail. The tee box adapter fitting 800 includes a first insulated housing portion 810 and a second insulated housing portion 810'. The insulated housing portion 810 and the insulated housing portion 810' are connected to one another by a t-shaped portion 810". The housing portion 810 and the insulated housing portion 810' are connected to the top of the tee shaped insulated portion 810". A snap fit end 812 is attached to the bottom of the tee shaped insulated housing portion 810". The first insulated housing portion 810 holds a plate 820 which engages the first insulated housing portion 810. Attached to and located inside the periphery of the plate 820 are a plurality of male pins 830. The male pins 830 face outwardly toward the pin end 811 of the first insulated housing portion 810. The outer periphery of the first insulated housing portion 810 and the plate 820 form a pocket for receiving a female end 400 of the conduit assembly 200. As shown in FIG. 8A, there are seven male pins 830 which correspond to six wires which carry power or signals and a ground pin. The male pins 830 include a portion that attaches to individual wires or conductors 220 to the plurality of male pins 830. These could be blades or flats 840 to which individual conductors or wires 220 are connected. In this embodiment, there are seven individual wires or conductors within the conduit 210 and to which the male pins 830 are electrically coupled. The second insulated housing portion 810' has a similar structure. The description of 810 above is equally applicable to the second insulated portion 810'. The numbers on the second insulated portion 810' are substantially the same but have a prime designation for the numbers used to identify elements on the second insulated portion 810'.

The snap fit end 812 at the bottom of the tee shaped portion 810" includes a plurality of prongs 813 which are sized to engage the knock-out opening of an electrical box. The snap fit end 812 in FIGS. 8A-8C is straight. It is contemplated that the tee shaped portion 810" could also include a bend in certain applications. In this particular example, the plurality of prongs 713 at the snap fit end 812 are forced into engagement with the knock-out opening of an electrical box. The snap fit end 812 then fits to or engages the electrical box. The conductors or wires 210 passing through the snap fit end are now in the box and a light fixture, switch, electrical outlet or the like can be electrically coupled to the wires 210 to form part of the desired circuit. In this particular embodiment, the tee box adapter fitting 800 has male pins 830. The box adapter fitting 800 could also be constructed with female pins so it could receive the male end 300 of the conduit apparatus 200. It is further contemplated that the tee box adapter fitting could be formed with both male and female pins in certain applications. It should be noted that the snap fit end 812 of the box adapter fitting 800 could be formed with most any angle and still be contemplated as within the scope of this invention.

Figure 9A:
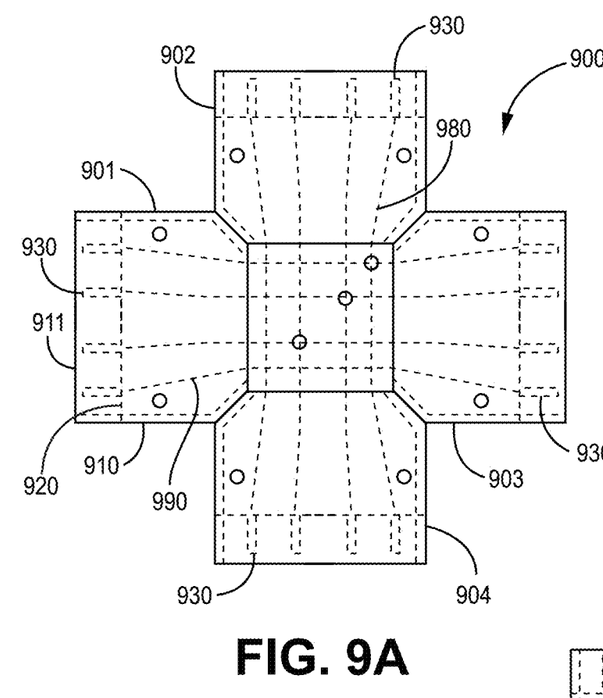
FIG. 9A is a top view of a cross connector for four conduit runs, according to an example embodiment.
Figure 9B:
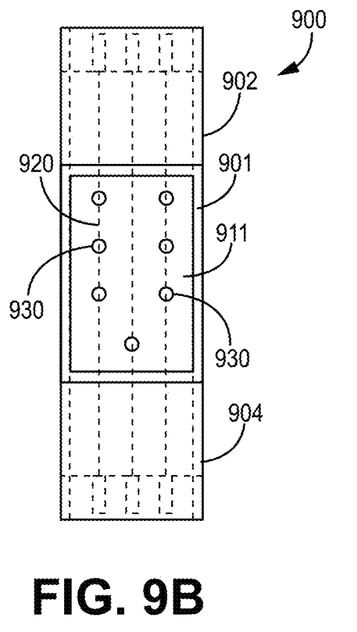
FIG. 9B is a side view of a cross connector for four conduit runs, according to an example embodiment.

FIG. 9A is a top view of a cross connector 900 for four conduit runs, according to an example embodiment. FIG. 9B is a side view of a cross connector 900 for four conduit runs, according to an example embodiment. The cross connector 900 is capable of connection to the ends of four conduit assemblies 200 and will essentially replace a traditional electrical box used as a junction box. The cross connector 900 shown has male pins 930. It is contemplated that in another embodiment, the pins could all be female pin connectors. It is further contemplated, that in still further embodiments, The pins of the cross connector 900 could be mixed. The cross connector 900 includes four arms 901, 902, 903, 904. Each arm 901, 902, 903, 904 has substantially the same configuration. As a result, one arm will be discussed with the understanding that the remaining arms are formed substantially the same. The arm 901 is part of the insulated housing 910 of the cross connector. The arm 901 includes a pin end 911. Near the pin end 911 there is a plate 920 which engages the insulated housing 910. Attached to and located inside the periphery of the plate 820 are a plurality of male pins 930. The male pins 730 face outwardly toward the pin end 911 of the insulated housing 910. The outer periphery of the insulated housing 910 and the plate 920 form a pocket for receiving a female end 400 of the conduit assembly 200. As shown in FIG. 9B, there are seven male pins 930 which correspond to six wires which carry power or signals and a ground pin. The male pins 930 are attached to individual wires or conductors 990 which are electrically coupled to other pins associated with the cross connector 900. In some instances, the conductors pass through the cross connector 900 to a pin associated with another of the arms 902, 903, 904. In other instances, a conductor will electrically connect to all four arms 901, 902, 903, 904. There may be a junction point where individual wires are soldered or otherwise connected at a connection point, such as 980 shown in FIG. 9A. Again, all pins shown in this example are male pins. There could be an all female pin version or a version which will have female pins associated with one or more of the arms 901, 902, 903, 904 and will have male pins associated with the other of the remaining arms 901, 902, 903, 904.

The various fittings described above can be configured to carry different numbers of wires. The amperage of the circuit determines the gauge of the wire which can be used in the various connectors and boxes discussed above. The gauge of the wire used or needed may, in turn, limit the number wires that can be used for a fitting or box. The below tables set forth the various configurations for 10 amp, 15 amp and 20 amp circuits. The circuits are for a straight adapter (shown in FIGS. 5A-5C), a 90-degree adapter (shown in FIGS. 6A-6C), a 45-degree adapter (shown in FIGS. 7A-7C), a tee (shown in FIGS. 8A-8C), and a cross (shown in FIGS. 9A-9B). For 10 amp circuits, the number of wires or the circuit type that includes a ground is set forth in Table 1.

TABLE 1

|  | Circuit Type | # of Wires Including Ground | Circuit Amperage | Wire Gage |
| --- | --- | --- | --- | --- |
| Straight | Single | 3 | 10 Amp | 14 |
| 90 Deg | Single | 3 | 10 Amp | 14 |
| 45 Deg | Single | 3 | 10 Amp | 14 |
| Tee | Single | 3 | 10 Amp | 14 |
| Cross | Single | 3 | 10 Amp | 14 |
| Straight | Double | 5 | 10 Amp | 14 |
| 90 Deg | Double | 5 | 10 Amp | 14 |
| 45 Deg | Double | 5 | 10 Amp | 14 |
| Tee | Single | 5 | 10 Amp | 14 |
| Cross | Single | 5 | 10 Amp | 14 |
| Straight | Triple | 7 | 10 Amp | 14 |
| 90 Deg | Triple | 7 | 10 Amp | 14 |
| 45 Deg | Triple | 7 | 10 Amp | 14 |
| Tee | Single | 7 | 10 Amp | 14 |
| Cross | Single | 7 | 10 Amp | 14 |

For 15 amp circuits, the number of wires or the circuit type that includes a ground is set forth in Table 2.

TABLE 2

|  | Circuit Type | # of Wires Including Ground | Circuit Amperage | Wire Gage |
| --- | --- | --- | --- | --- |
| Straight | Single | 3 | 15 Amp | 12 |
| 90 Deg | Single | 3 | 15 Amp | 12 |
| 45 Deg | Single | 3 | 15 Amp | 12 |
| Tee | Single | 3 | 15 Amp | 12 |
| Cross | Single | 3 | 15 Amp | 12 |
| Straight | Double | 5 | 15 Amp | 12 |
| 90 Deg | Double | 5 | 15 Amp | 12 |
| 45 Deg | Double | 5 | 15 Amp | 12 |
| Tee | Single | 5 | 15 Amp | 12 |
| Cross | Single | 5 | 15 Amp | 12 |
| Straight | Triple | 7 | 15 Amp | 12 |
| 90 Deg | Triple | 7 | 15 Amp | 12 |

TABLE 2-continued

|  | Circuit Type | # of Wires Including Ground | Circuit Amperage | Wire Gage |
|---|---|---|---|---|
| 45 Deg | Triple | 7 | 15 Amp | 12 |
| Tee | Single | 7 | 15 Amp | 12 |
| Cross | Single | 7 | 15 Amp | 12 |

For 20 amp circuits, the number of wires or the circuit type that includes a ground is set forth in Table 3.

TABLE 3

|  | Circuit Type | # of Wires Including Ground | Circuit Amperage | Wire Gage |
|---|---|---|---|---|
| Straight | Single | 3 | 20 Amp | 12 |
| 90 Deg | Single | 3 | 20 Amp | 12 |
| 45 Deg | Single | 3 | 20 Amp | 12 |
| Tee | Single | 3 | 20 Amp | 12 |
| Cross | Single | 3 | 20 Amp | 12 |
| Straight | Double | 5 | 20 Amp | 12 |
| 90 Deg | Double | 5 | 20 Amp | 12 |
| 45 Deg | Double | 5 | 20 Amp | 12 |
| Tee | Single | 5 | 20 Amp | 12 |
| Cross | Single | 5 | 20 Amp | 12 |
| Straight | Triple | 7 | 20 Amp | 12 |
| 90 Deg | Triple | 7 | 20 Amp | 12 |
| 45 Deg | Triple | 7 | 20 Amp | 12 |
| Tee | Single | 7 | 20 Amp | 12 |
| Cross | Single | 7 | 20 Amp | 12 |

In summary, an electric metallic tube (EMT) conduit apparatus includes an electric metallic tube (EMT) conduit, a first insulated connector housing attached to a first end of the electric metallic tube (EMT) conduit and a second insulated connector housing attached to a first end of the electric metallic tube (EMT) conduit. The first insulated connector housing includes a plurality of electrically conductive male pins and the second insulated connector housing includes a plurality of electrically conductive female pins. A plurality of conductors within the electric metallic tube (EMT) conduit include a first end attached to one of the male pins of the first insulated connector housing, and a second end attached to one of the female pins of the second insulated connector housing. In some embodiments the electric metallic tube (EMT) conduit apparatus also includes a swivel joint that joins the first insulated connector housing to the first end of the electric metallic tube (EMT) conduit. In other embodiments, the electric metallic tube (EMT) conduit apparatus includes both a first swivel joint that joins the first insulated connector housing to the first end of the electric metallic tube (EMT) conduit, and a second swivel joint that joins the second insulated connector housing to the second end of the electric metallic tube (EMT) conduit. The plurality of conductors running the length of the electric metallic tube (EMT) conduit are insulated. The plurality of sets of wires include a neutral wire, a positive wire and a ground wire. In some embodiments, there are seven individual wires connecting the male pins of the first insulated connector housing to the female pins of the second insulated connector housing. In one embodiment, the electric metallic tube (EMT) conduit, the first insulated connector housing attached to a first end of the electric metallic tube, and the second insulated connector housing attached to a second end of the electric metallic tube substantially seal the plurality of conductors within the electric metallic tube (EMT) conduit.

The electric metallic tube (EMT) conduit is formed so that it can snap fit to other components to for an electrical system for a building. The electrical system for a building includes a plurality of electric metallic tube (EMT) conduit apparatus snap fit to one another to form a run of the plurality of electric metallic tube (EMT) conduit apparatus. Each electric metallic tube (EMT) conduit apparatus includes an electric metallic tube (EMT) conduit, a first insulated connector housing attached to a first end of the electric metallic tube (EMT) conduit and a second insulated connector housing attached to a first end of the electric metallic tube (EMT) conduit. The first insulated connector housing includes a plurality of electrically conductive male pins and the second insulated connector housing includes a plurality of electrically conductive female pins. A plurality of conductors within the electric metallic tube (EMT) conduit include a first end attached to one of the male pins of the first insulated connector housing, and a second end attached to one of the female pins of the second insulated connector housing. In some embodiments the electric metallic tube (EMT) conduit apparatus also includes a swivel joint that joins the first insulated connector housing to the first end of the electric metallic tube (EMT) conduit. In another embodiment of the electrical system for a building, the electric metallic tube (EMT) conduit apparatus includes both a first swivel joint that joins the first insulated connector housing to the first end of the electric metallic tube (EMT) conduit, and a second swivel joint that joins the second insulated connector housing to the second end of the electric metallic tube (EMT) conduit.

Further embodiments of the electrical system for a building, include a box fitting. The box fitting includes a third insulated connector housing with pins that match to at least one of the first insulated connector housing or the second insulated connector housing of the electric metallic tube (EMT) conduit apparatus. The third insulated connector attached to one end of the box fitting. The box fitting also includes a collet formed to snap fit to a knock-out opening of a steel box, The collet is attached to the other end of the box fitting.

Other embodiments of the box fitting includes a curved portion for providing an elevational transition between the electric metallic tube (EMT) conduit and the box fitting. In some embodiments, the curved portion has an angle of substantially 90-degrees, 45-degrees, or 30-degrees. In still further embodiments, the curved portion for providing an elevational transition between the electric metallic tube (EMT) conduit and the box fitting also a swivel portion which allows fine alignment.

Other fittings are also contemplated in further embodiments of the electrical system for a building. One fitting is a tee box adapter fitting that includes a first tee box insulated connector housing on one end of the tee box adapter, a second tee box insulated connector housing on one end of the tee box adapter, and a T-shaped conduit carrying a plurality of insulated conductors electrically connected to the first tee box insulated connector housing and the second tee box insulated connector housing.

Still further embodiments of the electrical system for a building include a four-way cross connector that includes a main body having at least three electrical connection points, a first four-way insulated connector housing attached to the main body, a second four-way insulated connector housing attached to the main body, a third four-way insulated connector housing attached to the main body and a fourth four-way insulated connector housing attached to the main body. The four-way cross connector also includes a plurality of connectors from the first four-way insulated connector housing, the second four-way insulated connector housing, the third four-way insulated connector housing, and the fourth four-way insulated connector housing that are electrically attached to the three electrical connection points in the main body.

The foregoing discussion discloses and describes merely exemplary embodiments. Upon review of the specification, one of ordinary skill in the art will readily recognize from such discussion, and from the accompanying figures and claims, that various changes, modifications and variations can be made therein without departing from the spirit and scope of the inventions as defined in the following claims.

What I claim is:

1. An electric metallic tube (EMT) conduit apparatus comprising:
   an electric metallic tube (EMT) conduit;
   a first insulated connector housing attached to a first end of the electric metallic tube (EMT) conduit further including a plurality of electrically conductive male pins;
   a second insulated connector housing attached to a first end of the electric metallic tube (EMT) conduit further including a plurality of electrically conductive female pins; and
   a plurality of conductors within the electric metallic tube (EMT) conduit including:
      a first end attached to one of the male pins of the first insulated connector housing; and
      a second end attached to one of the female pins of the second insulated connector housing.

2. The electric metallic tube (EMT) conduit apparatus of claim 1 further comprising a swivel joint that joins the first insulated connector housing to the first end of the electric metallic tube (EMT) conduit.

3. The electric metallic tube (EMT) conduit apparatus of claim 1 further comprising:
   a first swivel joint that joins the first insulated connector housing to the first end of the electric metallic tube (EMT) conduit; and
   a second swivel joint that joins the second insulated connector housing to the second end of the electric metallic tube (EMT) conduit.

4. The electric metallic tube (EMT) conduit apparatus of claim 1 wherein the plurality of conductors running the length of the electric metallic tube (EMT) conduit are insulated.

5. The electric metallic tube (EMT) conduit apparatus of claim 1 wherein there are a plurality of sets of wires including a neutral and a positive wire.

6. The electric metallic tube (EMT) conduit apparatus of claim 1 wherein there are seven individual wires connecting the male pins of the first insulated connector housing to the female pins of the second insulated connector housing.

7. The electric metallic tube (EMT) conduit apparatus of claim 1 wherein the electric metallic tube (EMT) conduit, the first insulated connector housing attached to a first end of the electric metallic tube, and the second insulated connector housing attached to a second end of the electric metallic tube substantially seal the plurality of conductors within the electric metallic tube (EMT) conduit.

8. An electrical system for a building comprising:
   a plurality of electric metallic tube (EMT) conduit apparatus snap fit to one another to form a run of the plurality of electric metallic tube (EMT) conduit apparatus, each electric metallic tube (EMT) conduit apparatus comprising:
      an electric metallic tube (EMT) conduit;
      a first insulated connector housing attached to a first end of the electric metallic tube (EMT) conduit further including a plurality of electrically conductive male pins;
      a second insulated connector housing attached to a first end of the electric metallic tube (EMT) conduit further including a plurality of electrically conductive female pins; and
      a plurality of conductors within the electric metallic tube (EMT) conduit including:
         a first end attached to one of the male pins of the first insulated connector housing; and
         a second end attached to one of the female pins of the second insulated connector housing.

9. The electrical system for a building of claim 8 further comprising:
   a first swivel joint that joins the first insulated connector housing to the first end of the electric metallic tube (EMT) conduit; and
   a second swivel joint that joins the second insulated connector housing to the second end of the electric metallic tube (EMT) conduit, the first swivel joint and the second swivel accommodating differences in alignment between adjacent and attached electric metallic tube (EMT) conduit apparatus.

10. The electrical system for a building of claim 8 further comprising a box fitting which includes:
   a third insulated connector housing with pins that match to at least one of the first insulated connector housing or the second insulated connector housing of the electric metallic tube (EMT) conduit apparatus, the third insulated connector attached to one end; and
   a collet formed to snap fit to a knock-out opening of a steel box attached to the other end of the box fitting.

11. The electrical system for a building of claim 10 wherein the box fitting includes a curved portion for providing an elevational transition between the electric metallic tube (EMT) conduit and the box fitting.

12. The electrical system for a building of claim 10 wherein the box fitting includes a curved portion for providing an elevational transition between the electric metallic tube (EMT) conduit and the box fitting.

13. The electrical system for a building of claim 10 wherein the box fitting includes a curved portion for providing an elevational transition between the electric metallic tube (EMT) conduit and the box fitting, the curved portion having an angle of substantially 90-degrees.

14. The electrical system for a building of claim 10 wherein the box fitting includes a curved portion for providing an elevational transition between the electric metallic tube (EMT) conduit and the box fitting, the curved portion having an angle of substantially 45-degrees.

15. The electrical system for a building of claim 10 wherein the box fitting includes a curved portion for providing an elevational transition between the electric metallic tube (EMT) conduit and the box fitting, the curved portion includes a swivel portion.

16. The electrical system for a building of claim 8 further comprising a tee box adapter fitting that includes:
   a first tee box insulated connector housing on one end of the tee box adapter;
   a second tee box insulated connector housing on one end of the tee box adapter; and
   a T-shaped conduit carrying a plurality of insulated conductors electrically connected to the first tee box insulated connector housing and the second tee box insulated connector housing.

17. The electrical system for a building of claim 8 further comprising a four-way cross connector comprising:
- a main body having at least three electrical connection points;
- a first four-way insulated connector housing attached to the main body;
- a second four-way insulated connector housing attached to the main body;
- a third four-way insulated connector housing attached to the main body;
- a fourth four-way insulated connector housing attached to the main body; and
- a plurality of connectors from the first four-way insulated connector housing, the second four-way insulated connector housing, the third four-way insulated connector housing, and the fourth four-way insulated connector housing electrically attached to the three electrical connection points in the main body.

* * * * *